Patented Oct. 27, 1953

2,657,236

UNITED STATES PATENT OFFICE 2,657,236

PREPARATION OF KETONE-DIARYLAMINE CONDENSATES

Ivan Mankowich, Naugatuck, Conn., assignor to United States Rubber Company, New York, N. Y., a corporation of New Jersey No Drawing. Application July 3, 1951, Serial No. 235,103

10 Claims. (Cl. 260—576)

This invention relates to improvements in the preparation of the condensation products of aliphatic ketones and diarylamines.

The composite condensation products of aliphatic ketones with diarylamines, especially the condensation product of acetone with diphenylamine, and acetone with phenyl b-naphthylamine have been sold widely as rubber antioxidants. Ordinarily, these have been prepared in the presence of an acidic catalyst such as iodine, ferrous iodide, hydriodic acid, hydrogen bromide, zinc chloride, calcium chloride, etc.

It has now been found that the condensation of aliphatic ketones and diarylamines can be promoted by a catalyst selected from the class consisting of halogenated organic acids, esters of halogen-containing organic acids and amides of halogenated organic acids, in which a halogen substituent is directly linked to a saturated acyclic carbon atom.

An excess of either ketone or amine can be used, or they can be reacted in equimolecular proportions. It is preferred, however, to have the ketone in excess.

Exemplary of such chemical promoters are: chloracetic acid, bromacetic acid, iodoacetic acid, dichloracetic acid, dibromacetic acid, trichloracetic acid, alpha, beta-dichlorpropionic acid, alpha-bromo stearic acid, propyl chloro acetate, chloro succinic acid; ethyl chloracetate, n-butyl chloracetate, ethyl dichloracetate, ethyl trichloracetate, ethyl chlorpropionate, ethyl alphachloro stearate, dodecyl chloro acetate; chloracetamide, alpha - chlorpropionamide, beta-chlorpropionamide, alpha - brompropionamide, N-methyl chloracetamide, N,N-dimethyl chloracetamide, N,N-diethyl chloracetamide, N,N-dibutyl alpha - chlorpropionamide, N,N - diamyl chloacetamide.

The amount of the promoter to be used can vary from 0.03 to 10%, or better, but is preferably 0.05 to 5.0% of the weight of the diarylamine, and will depend on:

1. The nature of the promoter, the diarylamine and the ketone.
2. The time cycle of production.
3. The temperature of reaction.
4. The desired viscosity of the product.
5. The range of proportions of the ketone and the diarylamine.

The reaction initiator may be added as such, or dissolved in the ketone, or in the diarylamine, before the reactants are brought to reaction temperature or, alternately, the mixture of the reactants may be brought to temperature before the addition of the promoter via injection. Furthermore, mixtures of the promoters may be used. Another variation is the concurrent addition of the reactants to a heated reaction zone.

It is well-known that the reaction of an aliphatic ketone and a diarylamine can be carried out by reflux, by passage of ketone vapor through the amine, and by autoclaving of the reactants at 140° C. upwards. The promoters of this invention are applicable to all these methods, although for the vapor process at 140° C., or above, generally the higher boiling halogenated materials are preferred.

While the use of the present reaction promoters is primarily intended in the systems, acetone-diphenylamine, and acetone-phenyl beta-naphthylamine, other aliphatic ketone-diarylamine systems, such as:

Acetone-phenyl alpha-naphthylamine
Acetone-phenyl-p-tolylamine
Acetone-di-p-tolylamine
Methyl ethyl ketone-diphenylamine
Methyl ethyl ketone-phenyl-b-naphthylamine
Methyl ethyl ketone-phenyl xenylamine
Methyl ethyl ketone-phenyl-a-naphthylamine may be used, and are also subject to reaction initiation by the promoters of this invention.

Example

In the following table, runs in sealed glass tubes are described. In each case 59.6 gr. diphenylamine and 39.7 gr. acetone were used. The general conditions of reaction were six hours at 240–250° C. In each case, the glass tube, after cooling, was opened and the reaction freed of unreacted acetone, water, etc., by drying at ca. 5 mm. to 150° C.

| Run No. | Catalyst | Amount in Grams | Gram Yield of Condensation Product | Condensate Viscosity (Poises at 30° C.) |
|---|---|---|---|---|
| 1 | Dichloracetamide | .139 | 73.3 | 29.7 |
| 2 | Beta-bromo ethyl acetate | .362 | 78.2 | 240 |
| 3 | Bromacetic acid | .301 | 80.6 | 184 |
| 4 | Alpha-bromo stearic acid | .778 | 74.7 | 78.5 |
| 5 | Iodoacetic acid | .409 | 74.8 | 56 |
| 6 | Beta-iodo propionic acid | .434 | 75.8 | 184 |

The condensation products of this invention may also be used as antioxidants for rubber and rubber-like materials which are subject to deterioration by air.

Having thus described my invention, what I claim and desire to protect by Letters Patent is:

1. In a method of preparing a composite product of condensation of an aliphatic ketone and a diarylamine, the improvement which consists in adding to the reaction mix, a chemical promoter which is selected from the class consisting of halogenated aliphatic organic acids, esters of halogen-containing aliphatic organic acids, and amides of halogenated aliphatic organic acids, wherein the organic acid in each instance has carboxyl attached to carbon of an alkyl group, and the halogen is from the class consisting of chlorine, bromine, and iodine, and heating the mix in the presence of said promoter.

2. In a method of preparing a composite product of condensation of an aliphatic ketone and a diarylamine, the improvement which consists in adding to the reaction mix, a chemical promoter which is dichloracetamide, and heating the mix in the presence of said promoter.

3. In a method of preparing a composite product of condensation of an aliphatic ketone and a diarylamine, the improvement which consists in adding to the reaction mix, a chemical promoter which is bromoacetic acid, and heating the mix in the presence of said promoter.

4. In a method of preparing a composite product of condensation of an aliphatic ketone and a diarylamine, the improvement which consists in adding to the reaction mix, a chemical promoter which is alpha-bromo stearic acid, and heating the mix in the presence of said promoter.

5. In a method of preparing a composite product of condensation of an aliphatic ketone and a diarylamine, the improvement which consists in adding to the reaction mix, a chemical promoter which is iodoacetic acid, and heating the mix in the presence of said promoter.

6. In a method of preparing a composite product of condensation of an aliphatic ketone and a diarylamine, the improvement which consists in adding to the reaction mix, a chemical promoter which is beta-iodo propionic acid, and heating the mix in the presence of said promoter.

7. In a method of preparing a composite product of condensation of a dialkyl ketone and a diarylamine, the improvement which consists in adding to the reaction mix, a chemical promoter which is selected from the class consisting of halogenated aliphatic organic acids, esters of halogen-containing aliphatic organic acids, and amides of halogenated aliphatic organic acids, wherein the organic acid in each instance has carboxyl attached to carbon of an alkyl group, and the halogen is from the class consisting of chlorine, bromine, and iodine, and heating the mix in the presence of said promoter.

8. In a method of preparing a composite product of condensation of acetone and a diphenylamine, the improvement which consists in adding to the reaction mix, a chemical promoter which is selected from the class consisting of halogenated aliphatic organic acids, esters of halogen-containing aliphatic organic acids, and amides of halogenated aliphatic organic acids, wherein the organic acid in each instance has carboxyl attached to carbon of an alkyl group, and the halogen is from the class consisting of chlorine, bromine, and iodine, and heating the mix in the presence of said promoter.

9. In a method of preparing a composite product of condensation of a dialkyl ketone and a diarylamine, the improvement which consists in adding to the reaction mix, a chemical promoter which is selected from the class consisting of halogenated aliphatic organic acids, esters of halogen-containing aliphatic organic acids, and amides of halogenated aliphatic organic acids, wherein the organic acid in each instance has carboxyl attached to carbon of an alkyl group, and the halogen is from the class consisting of chlorine, bromine, and iodine, and heating the mix in the presence of said promoter, the proportion of said promoter ranging, by weight, from about 0.03 to about 10 percent, based on the diarylamine.

10. In a method of preparing a composite product of condensation of acetone and a diphenylamine, the improvement which consists in adding to the reaction mix, a chemical promoter which is selected from the class consisting of halogenated aliphatic organic acids, esters of halogen-containing aliphatic organic acids, and amides of halogenated aliphatic organic acids, wherein the organic acid in each instance has carboxyl attached to carbon of an alkyl group, and the halogen is from the class consisting of chlorine, bromine, and iodine, and heating the mix in the presence of said promoter, the proportion of said promoter ranging, by weight, from about 0.03 to about 10 percent, based on the diphenylamine.

IVAN MANKOWICH.

References Cited in the file of this patent

UNITED STATES PATENTS

| Number | Name | Date |
|---|---|---|
| 1,935,279 | Ter Horst | Nov. 14, 1933 |
| 2,160,223 | Meuser et al. | May 30, 1939 |

OTHER REFERENCES

Groggins: "Unit Proc. in Org. Syn.," 3rd ed. (1947), p. 171.